Aug. 11, 1970    E. PLUMAT    3,523,780
METHOD OF HEATING A GLASS MELTING FURNACE
Filed Nov. 10, 1966    4 Sheets-Sheet 1

INVENTOR
Emile Plumat
BY Spencer & Kaye
ATTORNEYS

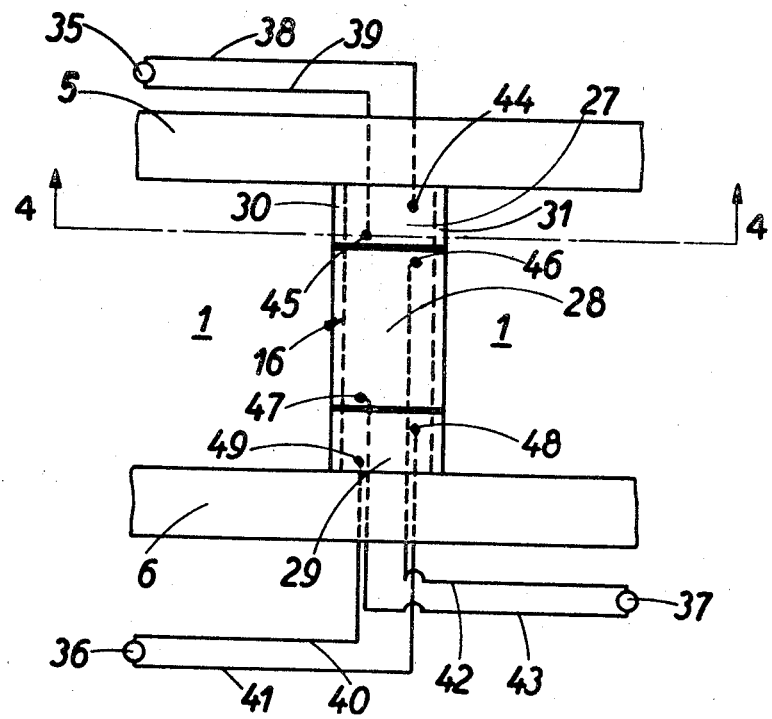
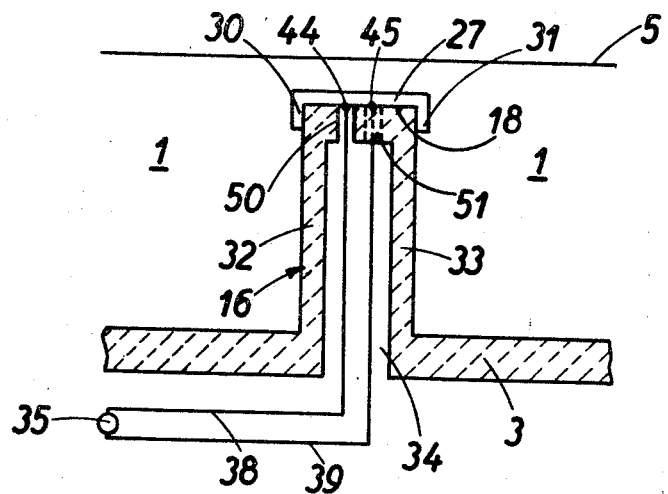

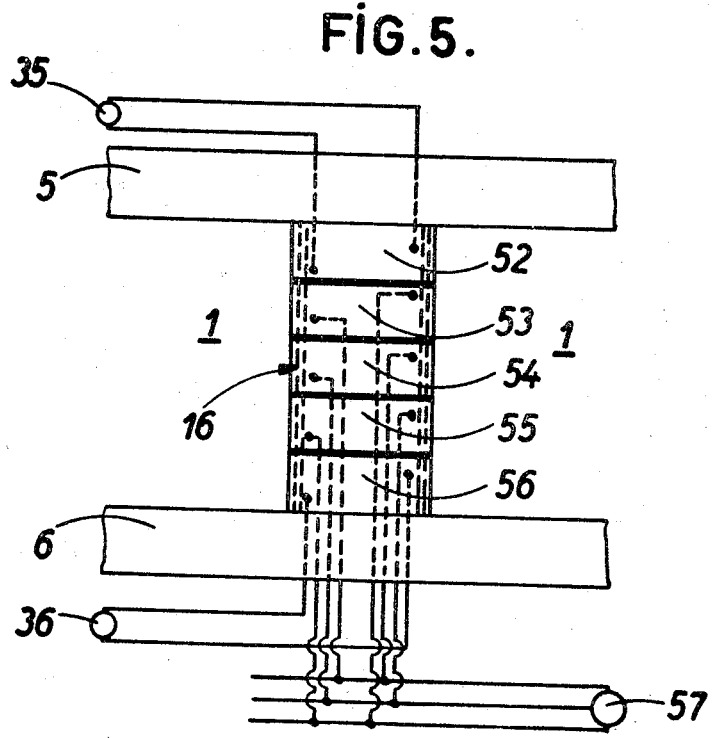
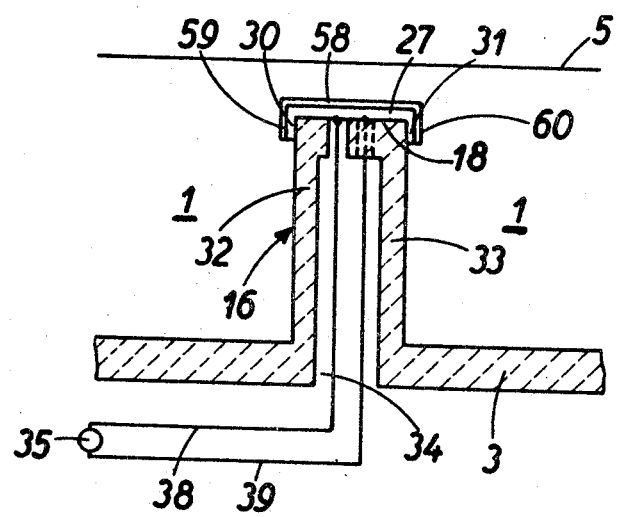

INVENTOR
Emile Plumat
BY Spencer & Kaye
ATTORNEYS

United States Patent Office 3,523,780
Patented Aug. 11, 1970

3,523,780
METHOD OF HEATING A GLASS
MELTING FURNACE
Emile Plumat, Gilly, Belgium, assignor to
Glaverbel S.A., Brussels, Belgium
Filed Nov. 10, 1966, Ser. No. 593,513
Claims priority, application Luxembourg, Nov. 11, 1965, 49,817
Int. Cl. C03b 5/04
U.S. Cl. 65—135         3 Claims

ABSTRACT OF THE DISCLOSURE

This invention relates to the manufacture of glass and to glass melting tank furnaces as well as to a process which takes place therein. These furnaces have a withdrawal end from which the molten glass is withdrawn. Upstream of the withdrawal end is the hottest point in the furnace known as the "hot spot." The hot spot acts as a thermal barrier and prevents unmelted batch from passing into the refined and working zones. In order to reduce the amount of cooler molten glass which flows back to the hot spot from the withdrawal end, a transverse wall or sill is provided. In accordance with the invention the heat for the main heating means can be lessened if an additional heating means is provided in the vicinity of the sill. This additional heating means can then directly heat the cooler molten glass returning to the hot spot from the withdrawal end.

In the operation of glass-melting tank furnaces the temperature along the length of the tank reaches a maximum at some distance from the charging end. At this point, known as the "hot spot" molten glass wells up towards the surface of the molten glass bath along which the withdrawal current flows. The hot spot is beneficial in that it acts as a thermal barrier which restrains unmelted batch from passing into the refining and working zones. However the heat supply at the hot spot has to be considerable in order that the glass in the return flow from the witdrawal end of the tank shall be sufficiently heated to cause this glass to rise at this spot.

It has been proposed to reduce the amount of glass flowing back to the hot spot from the withdrawal end by providing a transverse wall in the bottom portion of the tank between the hot spot and the withdrawal end. This proposal stems from an appreciation of the fact that the quantity of glass which normally flows back to the hot spot in the return current is greater than is required for forming a satisfactory barrier. The purpose of the transverse wall, which may be termed "the sill," is to reduce the quantity of glass flowing back to the hot spot from the withdrawal end and thus permit the heat supply over the bath at the hot spot to be reduced.

With this in mind it is the main object of the present invention to provide an arrangement wherein an appreciable further saving of heat and thus fuel is possible over and above that which is possible according to the method mentioned above, and the means and method by which this improvement can be effected is part of the present invention.

Another object of the invention is to provide such an arrangement which relieves the tank furnace from exposure to the intense localized heat which is normally used.

A further object of the present invention is to provide heat directly to the return current in the glass bath.

These objects and others ancillary thereto are accomplished in accordance with preferred embodiments of the invention wherein a sill is provided for the same purpose as in the aforementioned prior proposal. However, associated with this sill is means for supplying heat within the molten glass bath so as to heat molten glass as it flows over the sill toward the hot spot. The sill and the supply of heat within the bath act together to reduce the amount of heat which has to be concentrated above the bath at the hot spot. The sill reduces the amount of glass flowing back into the hot spot per unit time and the temperature of the glass which does flow back to the hot spot is raised by the heating means with which the sill is provided or associated. Unlike the heat supplied above the surface of the bath, the heat supplied at the sill is not screened from the glass of the return current by intervening strata of glass but acts directly on the glass of the return current. The reduction in the quantity of heat which must be supplied above the bath at the hot spot is beneficial not only in reducing fuel consumption but also in relieving the tank itself from exposure to such intense localized heat as is normally necessary.

The present invention includes any glass manufacturing process wherein batch is melted in a glass-melting furnace provided with a sill over which molten glass flows towards the hot spot from the withdrawal end of the tank, and wherein heat is supplied locally within the bath of molten glass at the site of the sill so as to increase the temperature of the molten glass as it flows over the sill The invention also includes any glass-melting tank furnace wherein there is a sill located in the bottom of the tank between its withdrawal end and a position at which a hot spot can be maintained when the furnace is in operation, and wherein the sill is provided or associated with means for supplying heat within the molten glass bath for heating molten glass as it flows over the sill towards the hot spot.

Additional objects and advantages of the present invention will become apparent upon consideration of the following description when taken in conjunction with the accompanying drawings in which:

FIG. 3 is a plan view of the top of the sill of another furnace in accordance with the present invention.

FIG. 4 is a vertical sectional view taken substantially along the plane defined by reference line 4—4 of FIG. 3.

FIG. 5 is a plan view of the top of the sill of another furnace in accordance with the present invention.

FIG. 6 is a vertical sectional view of a still further furnace in accordance with the present invention and which view is similar to that of FIG. 4.

Figure 1:
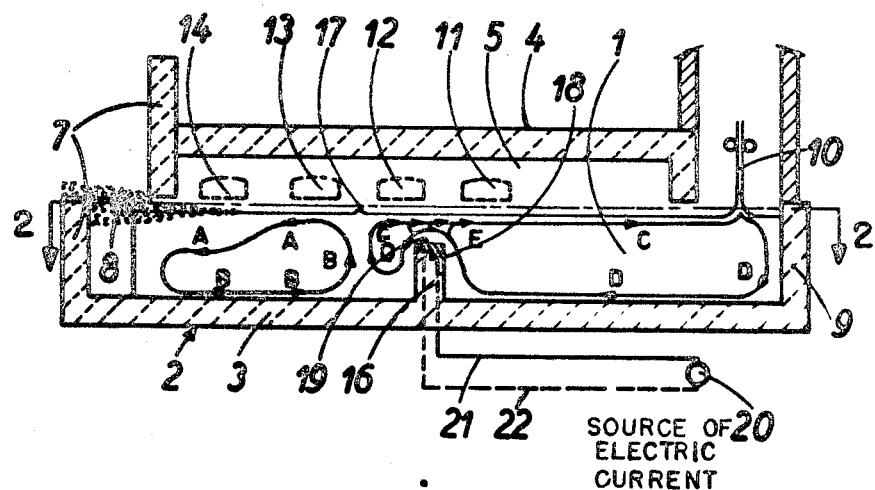
FIG. 1 is a longitudinal vertical sectional view of a glass tank furnace taken substantially along the plane defined by reference line 1—1 of FIG. 2.
Figure 2:
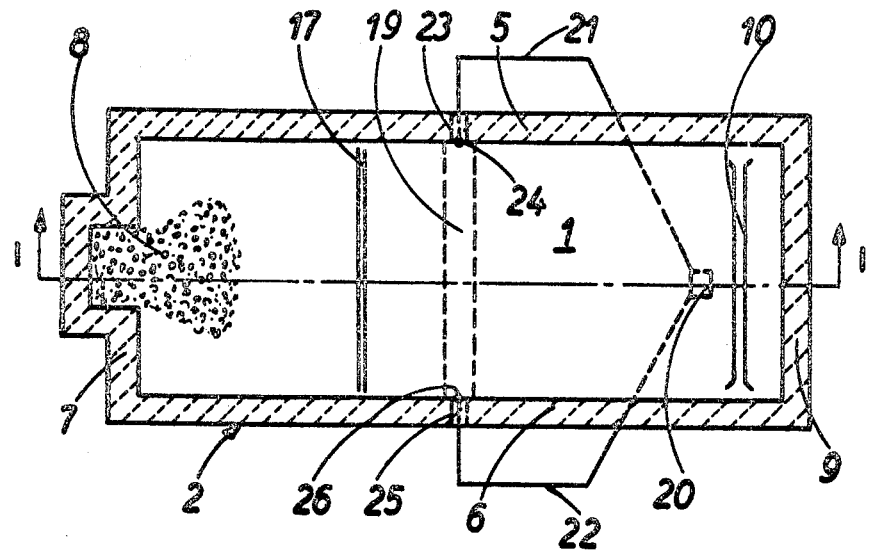
FIG. 2 is a horizontal sectional view taken substantially along the plane defined by reference line 2—2 of FIG. 1.

Referring to FIGS. 1 and 2, a bath 1 of molten glass is disposed in a tank furnace 2 comprising bottom wall 3, crown 4, two side walls 5, 6, transverse wall 7 at the charging end, and transverse wall 9 at the working end where the glass is withdrawn. In this case the glass is withdrawn as a sheet 10. The melting of the glass batch is performed by two groups of four burners operating alternately and extending through the side walls 5, 6 at places between the crown 4 and the level of the molten glass. These burners are designated 11 to 14 on the side wall 5. The tank furnace 2 has a transverse sill 16 immersed in the molten glass between the burners 11 and 12. The tank furnace is so heated that the hot spot 17 occurs between the burners 12 and 13. Upstream of the hot spot 17 there is a circulation in the bath causing movement of glass away from the hot spot 17 towards the transverse wall 7 at the charging end as shown by arrows A and a return current from the transverse wall 7 towards the hot spot 17 as shown by arrows B. Downstream of the hot spot there is a forward current in the molten glass as shown by arrows C which starts from the hot spot 17, passes over the immersed sill 16 and moves towards the transverse wall 9 at the working end of the tank, and a return current as shown by arrows D which moves away from the transverse wall 9 back towards the hot spot. Some of the glass in this return current passes above the sill 16 but below the surface current shown by the arrows C, and moves towards the hot spot 17.

The top 18 of the sill 16 is covered with a tungsten sheet 19 connected by two cables 21, 22 to an external source 20 of electric current. The cable 21 extends through the side wall 5 at a place 23 and is welded to the tungsten sheet 19 at point 24, while the cable 22 extends through the side wall 6 at a place 25 and is welded to the tungsten sheet at point 26. The external source 20 supplies single phase current which flows through the whole sheet 19, which it heats by Joule effect. The temperature depends on the thickness of the sheet 19 and the intensity of the current flowing therethrough. The tungsten sheet 19 transmits its heat to the glass of the return current D which flows immediately adjacent the top of the sill. Some of the glass thus heated rises as shown by arrows E towards the surface current shown by the arrows C and is directly entrained thereby and moves towards the transverse wall 9 at the withdrawal end of the tank. As shown by the arrows D, the rest of the glass follows the normal path of the return current towards the hot spot 17, but this glass is at a higher temperature than glass in the current circulating upstream of the threshold 16. The combination of these two effects enables the heat generated at the burners 12, 13 producing the hot spot 17 to be reduced, with consequent saving in fuel.

Referring to the embodiment of FIGS. 3 and 4, the top 18 of the sill 16 immersed in the molten glass 1 is covered by three juxtaposed tungsten sheets 27, 28, 29. The outer margins of the sheets are bent at an angle of 90° to the medial portions of the sheets to form flanges 30, 31. The sheets are thus of U-shape and fit over the top 18 of the sill. There is therefore no direct contact between the molten glass and the top of the sill. The sill 16 is hollow inside, being formed by spaced transverse walls 32, 33 interconnected by top wall 18. The tank bottom 3 is thus interrupted at a place 34 where the sill 16 is disposed. The tungsten sheets 27 to 29 are connected to different, controllable sources 35, 36, 37 of electric current by cables 38–39, 40–41, and 42–43, respectively. The sources produce continuous or single phase currents. The ends of the cables are welded at points 44–45, 46–47 and 48–49 to the bottom surfaces of the sheets which are in direct contact with the top 18 of the sill 16. The top wall 18 of the sill 16 is formed with apertures, as 50, 51 and the cables extend through these apertures and between the walls 32 and 33 of the sill and are connected to the electric current sources 35 to 37. These current sources supply currents of different intensities. The intensity is higher for the end sheets 27, 29 than for the central sheet 27, so that the end sheets are heated more intensely. The bottom wall 3 of the tank need not be interrupted at the place 34 where the sill 16 is disposed as long as apertures are provided in such bottom wall for passing the cables 38 to 43. More than three juxtaposed tungsten sheets can be provided on the top of the sill 16, but in this event a correspondingly larger number of sources of continuous or single phase current are used to permit the sheets to be individually controlled. As an alternative, if there are two end sheets and a number of intermediate sheets equal to three or a multiple of three, the end sheets may be connected to independent continuous or single phase current sources and the intermediate sheets may be supplied with three-phase current from a common source under a single control. Such an arrangement also permits more heat to be generated at the end portions of the sill near the side walls 5, 6 of the tank than at the medial portion of the sill, so as to raise the glass flowing immediately over the sill to a temperature which is substantially uniform across the width of the furnace tank.

Referring to FIG. 5, the top of the sill 16 is covered by five juxtaposed tin oxide blocks 52 to 56. In this embodiment the end blocks 52 and 56 are connected to external sources 35 and 36 of continuous or single phase electric current, while the three central blocks 53 to 55 are connected to a common external source 57 of three-phase electric current.

In the embodiment shown in FIG. 6, the top 18 of the sill 16 is covered, as in FIG. 4 by three juxtaposed tungsten sheets 27. However, each of these tungsten sheets is covered by a U-shaped platinum sheet 58. The size of each platinum sheet is such that it fits exactly over the underlying tungsten sheet 27. Thus the flanges 30, 31 of the tungsten sheets are covered by the flanges 59, 60 of the platinum sheets 58 and there is no direct contact between the molten glass and the top 18 of the sill. The platinum sheets 58 have a high heat-reflecting power and therefore upwardly reflect much of the heat radiated downwardly onto the sheets from the burners and the upper side walls of the furnace. The platinum sheets therefore materially contribute to the heating of the glass of the return current flowing over the top of the sill. On the other hand the tungsten sheets have higher mechanical strength than the platinum sheets under the operating temperatures and the tungsten sheets are mainly responsible for the mechanical strength of the sill covering. Instead of using platinum sheets for heat reflection, layers of platinum may be formed as coatings on the tungsten sheets.

Figure 7:
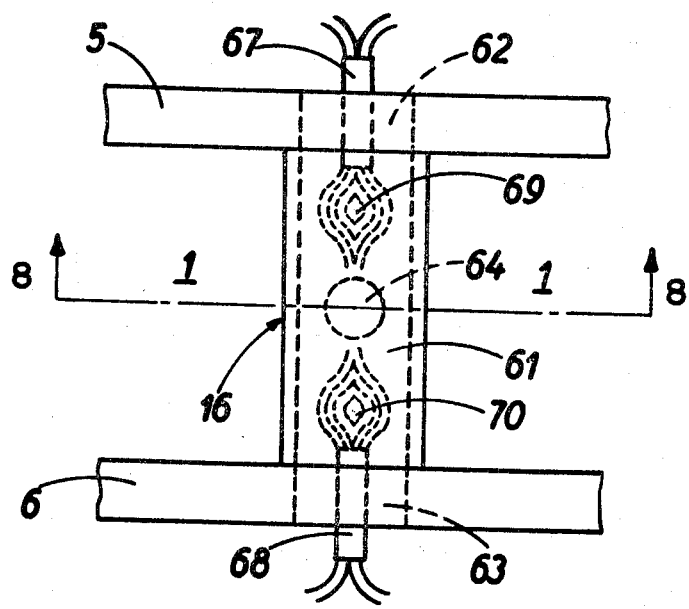
FIG. 7 is a plan view of the sill of yet another furnace according to the present invention.
Figure 8:
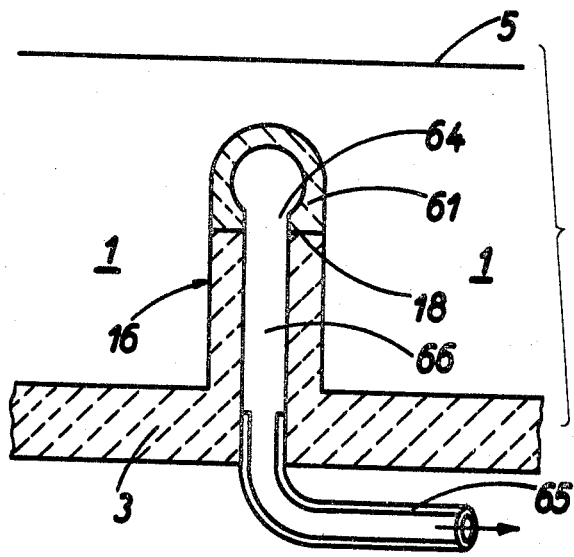
FIG. 8 is a vertical sectional view taken substantially along the plane defined by reference line 8—8 of FIG. 7.

Referring to FIGS. 7 and 8, which show a further embodiment of the invention, the top 18 of the sill 16 is in this case formed with a hollow top portion 61 of electrically cast refractory material. This top portion extends through apertures 62, 63 in the tank side walls 5, 6. An aperture 64 is formed in the bottom of the top portion 61, which aperture places the interior longitudinal passageway in the top portion in communication with a passageway 66 extending vertically through the sill 16 and through the bottom wall of the tank. An outlet pipe 65 is fitted to the bottom of passageway 66. Fuel burners 67, 68 intrude into the top portion of the sill through the ends thereof. The length and temperature of the flames 69, 70 from the burners can be controlled by regulating the proportions of the fuel and the combustion supporting agent and the degree to which the burners intrude into the interior of the sill portion 61. For example, the flames 69, 70 can be regulated to extend along the whole or part only of the top of the sill and it is possible to heat the end portions of the top of the sill more intensively than the central portion thereof. As a result of the high thermal conductivity of the electrically cast refractory composition, the wall at the top of the sill transmits to the glass flowing immediately over and in contact with the sill, quantities of heat which are greater at the places where the glass is cooler than at the places where the glass is not so cool. Consequently the temperature of the glass flowing back to the hot spot is made substantially uniform over the whole length of the sill. The combustion gases escape via the aperture 64, the passage 66 and the pipe 65. These gases can be directly discharged but are preferably introduced into some type of heat recovery system.

It can thus be seen that one or more heaters may form the top or part of the top of the sill. Alternatively, if the sill or a top portion thereof is hollow, as it may be, one or more heaters may be provided within this top portion.

One or more electrical resistance heaters may be used at the sill. For example, one or more electrical resistance heaters may be used which is or are formed of electrically conductive refractory material which is resistant to attack by molten glass, in which case the heater or heaters may form or cover the top of the sill and afford protection to underlying parts of the sill. Suitable materials for forming such heaters are tungsten, molybdenum, and platinum. Such materials can conveniently form electrical resistance elements in the form of plates. Other materials which can be used for forming electrical resistance heaters are tin oxide and carbon. Those materials, can, e.g., be used to form electrical resistance heaters in the form of tiles, blocks or the like.

It is advantageous for the top of the sill to be formed of a material which has good heat-reflecting properties and thus reflects heat radiating onto the sill from sources above the bath such as heaters and the furnace crown and upper side walls, and from the molten glass itself. Heat reflected in that way helps to increase the temperature of the return current as it passes the top of the sill, with consequent economy in heat supply to the heater or heaters at the sill. As materials with good heat-reflecting property are not necessarily the best for forming electrical resistance heaters an advantage is to be gained by covering the material selected for resistance heating with a material with greater heat-reflecting power, the two materials being in heat-conducting relationship. Suitable combinations of materials for this purpose can be formed from the group of materials above identified. For example, tungsten, tin oxide, or carbon may be used for resistance heating and may be covered by molybdenum or, more suitably, platinum. The heat-reflecting material may form an element or elements, e.g., a plate or plates, separate from the electrical resistance heater(s) or may be applied as a coating by spraying or in some other manner. Even in the event the heat-reflecting covering is formed from a separate element or elements the latter need not have much mechanical strength and can, e.g., be in the form of a thin sheet or sheets.

Instead of covering or forming the top of the sill by a heater or heaters the sill or a top portion thereof may be of hollow construction and heat may be supplied within the top portion of the sill. For example, one or more electrical resistance heaters may be installed within the top portion of the sill. Alternatively, one or more fuel burners may be installed in such sill portion. Burners of standard type used in glass-melting furnaces may be used. As a further alternative the heating at the sill may be effected by flowing hot gases through the top portion of the sill from one or each end thereof. In any event, any heater or burner installed within the sill does not necessarily have to be formed of material which is resistant to attack by molten glass since the heater or burner is protected by the refractory material of the sill. The part of the sill enclosing the heating means should have good thermal conductivity, as well as a high degree of resistance to attack by molten glass and such part can suitably be formed from electrically cast refractory material or tin oxide. The top of the sill may, if desired, be covered by sheet material or a deposit of material with good thermal conductivity and heat-reflecting properties.

Preferably, the heating means at the sill enables the heat output to be varied along the length of the sill. As the temperature in the molten bath will normally be lower towards the side walls of the tank than near the central longitudinal zone, the heating means is preferably arranged so that it can supply a larger amount of heat at the end portions of the sill than in a central portion thereof with a view to raising the temperature of the glass flowing over the sill to a level which is substantially uniform across the width of the tank. When using electrical resistance heating, the required variation in temperature along the sill may be achieved by installing at least two heaters in succession along the sill and connecting different heaters to different current sources which can be independently controlled to obtain a temperature differential, or connecting different heaters to a common source of current via circuitry which permits the current supply to the different heaters to be independently regulated. The heaters may be connected in series or in parallel. As an alternative or in addition to independent regulation of current supply to different heaters, different heaters may have different electrical resistivities. In the event that fuel burners are installed within the sill as above referred to, a required temperature gradient along the sill can be achieved by appropriate independent regulation of the combustion at the different burners and/or by adjusting the positions along the sill at which the fuel combustion takes place, e.g., by regulating the distance of intrusion of burners into the upper hollow portion of the sill through the ends thereof.

It will be understood that the above description of the present invention is susceptible to various modifications, changes, and adaptations, and the same are intended to be comprehended within the meaning and range of equivalents of the appended claims.

What is claimed is:

1. In the method of making glass in a glass melting furnace having an upstream or feed end and a downstream or delivery end, and containing a mass of molten glass between such ends, the improvement comprising the steps of:

applying heat to the glass in the furnace to create a maximum temperature region between the upstream and downstream ends of the furnace for forming a hot spot at such region, at which hot spot the glass flows upwardly, and to create two circulatory glass currents one of which is upstream of the hot spot and the other of which is downstream of the hot spot, each current having a lower portion flowing toward the hot spot, the lower portions of the two currents merging and flowing upwardly at the hot spot, and each current having an upper portion flowing away from the hot spot, the upper portions of the two currents thus flowing in respectively opposite directions;

blocking with a barrier, at a position slightly downstream of the hot spot, only the lower portion of the downstream current to deflect such portion to cause at least some of it to flow over the barrier, to descend upstream of the barrier before reaching the hot spot and to flow to the hot spot; and locally heating the lower portion of the downstream current in the vicinity of the barrier at a point downstream of the hot spot to increase the temperature of the deflected portion thus flowing over the barrier to a degree to cause a part thereof to rise and join with the upper portion of the downstream current, thereby preventing said part from returning to the hot spot.

2. A method as defined in claim 1 wherein the locally heating step includes supplying heat at the site of the barrier which varies from one zone to another along the barrier.

3. A method as defined in claim 2 wherein the locally heating step includes supplying greater heat at end portions of the barrier than in a central zone thereof.

References Cited

UNITED STATES PATENTS

| | | | |
|---|---|---|---|
| 1,880,541 | 10/1932 | Wadman | 65—135 |
| 2,119,949 | 6/1938 | Blau et al. | 65—347 X |
| 3,294,513 | 12/1966 | Beattie | 65—374 X |

FOREIGN PATENTS

| | | |
|---|---|---|
| 828,890 | 2/1960 | Great Britain. |
| 1,300,588 | 6/1962 | France. |

ARTHUR D. KELLOGG, Primary Examiner

U.S. Cl. X.R.

13—6; 65—136, 337, 374